United States Patent [19]

Miller, Jr.

[11] 4,222,618
[45] Sep. 16, 1980

[54] COMPLIANT HYDRODYNAMIC FLUID BEARING WITH RESILIENT SUPPORT MATRIX

[75] Inventor: William H. Miller, Jr., Schenectady, N.Y.

[73] Assignee: Mechanical Technology Incorporated, Latham, N.Y.

[21] Appl. No.: 974,262

[22] Filed: Dec. 29, 1978

[51] Int. Cl.³ .................. F16C 17/12; F16C 32/06
[52] U.S. Cl. .................................. 308/9; 308/121; 308/DIG. 1
[58] Field of Search ............... 308/9, 26, 36.3, 122, 308/73, 240, DIG. 1, DIG. 4, DIG. 15, DIG. 121

[56] References Cited

U.S. PATENT DOCUMENTS

| 3,884,534 | 5/1975 | Winn | 308/9 |
| 4,133,585 | 1/1979 | Licht | 308/DIG. 1 |

FOREIGN PATENT DOCUMENTS

| 903055 | 8/1962 | United Kingdom | 308/DIG. 1 |
| 582419 | 11/1977 | U.S.S.R. | 308/DIG. 1 |

Primary Examiner—Richard R. Stearns
Attorney, Agent, or Firm—Joseph V. Claeys; John M. Neary

[57] ABSTRACT

A resilient support for a compliant hydrodynamic fluid bearing includes a series of corrugated spring metal strips arranged side-by-side. The corrugations on adjacent strips are displaced axially a distance equal to one-half of the wave lengths of the corrugations so that the peaks on one strip are laterally aligned with the valleys on adjacent strips. This arrangement provides a uniform matrix of support zones for the bearing sheet to minimize localized deflections of the bearing sheet. It produces a bearing sheet profile under hydrodynamic loading which is approximately cylindrical so the supporting hydrodynamic fluid film is more uniform for the generation of greater pressures over a greater area.

11 Claims, 6 Drawing Figures

COMPLIANT HYDRODYNAMIC FLUID BEARING WITH RESILIENT SUPPORT MATRIX

BACKGROUND OF THE INVENTION

The field of fluid bearings has developed to the point at which bearing experts are now considering the application of compliant hydrodynamic fluid bearings for applications involving loads much greater than the load-carrying capacity that these bearings have previously been able to bear. The reason for this increased interest in this form of bearing is that the low cost, long life, and almost frictionless characteristics of these bearings make them extremely desirable for many applications. One of the primary impediments to adoption of bearings of this nature in place of conventional bearings has been their relatively limited load-carrying capacity. Numerous efforts have been made to solve this problem, with results that have been mostly disappointing or which introduce other problems, such as increased cost or lowered reliability.

SUMMARY OF THE INVENTION

Accordingly, the objects of this invention are to provide a compliant hydrodynamic fluid bearing having an increased load-carrying capacity. The bearing of this invention achieves its greater load-carrying capacity using the same thin, inexpensive and easily worked materials used in previous bearings of this nature, but arranged in a different manner to achieve a greater load capacity. The bearing of this invention also provides more uniform support for the shaft during start-up and slow-down phases of operation so that the anti-friction coating on the bearing sheet will last longer.

These objects of the invention are realized in one embodiment of this invention wherein the resilient support element for the bearing sheet is comprised of a plurality of strips formed in a wavy or corrugated pattern and disposed side-by-side between the bearing sheet and the bearing sleeve. The wave pattern of adjacent strips is displaced longitudinally an amount equal to ½ wave length so that peaks of one strip are laterally aligned adjacent the valleys of the adjacent strips. In this manner, a more uniform support is provided for the bearing sheet and therefore less local deflection of the bearing sheet occurs so that a large area of fluid film at high pressure can be generated without resort to heavier, stiffer and more expensive materials.

DESCRIPTION OF THE DRAWINGS

These and other objects of the invention and the invention itself will become more clear upon reading the following detailed description in conjunction with an examination of the following drawings, wherein.

DESCRIPTION OF THE PREFERRED EMBODIMENT

Figure 1:
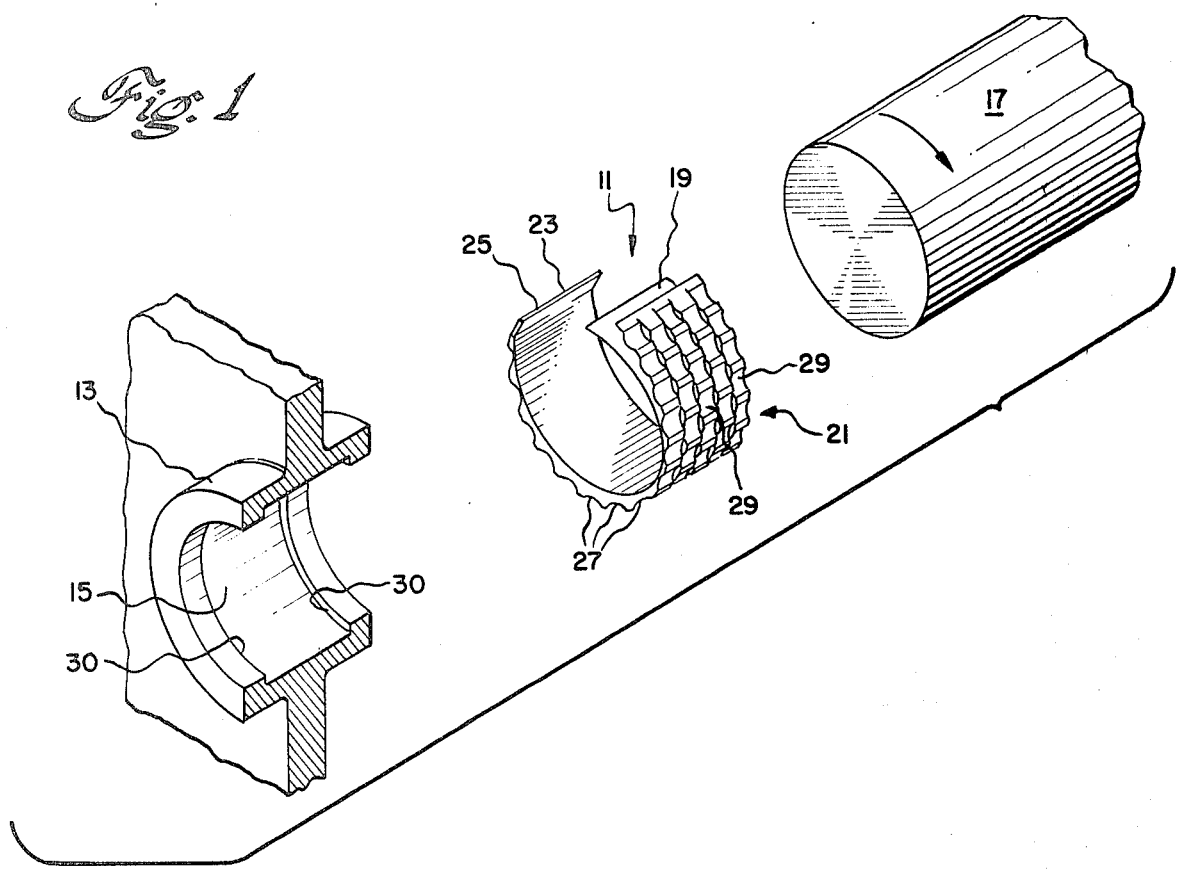
FIG. 1 is a perspective view of a resilient support element for a fluid bearing made in accordance with this invention.

Referring now to the drawings, wherein like reference characters designate identical or corresponding parts, and more particularly FIG. 1 thereof, a compliant hydrodynamic fluid bearing is shown having a bearing assembly 11 received in a bearing sleeve 13 having a bore 15 for receiving a rotatable shaft 17. The bearing assembly 11 includes a flexible bearing sheet 19 which is supported on the wall of the bore 15 by a series of regularly spaced resilient projections 27 on a resilient supporting element 21. The supporting element 21 and the flexible bearing sheet 19 are attached together at one end 23 with an intervening spacer block 25. The ends of the resilient supporting element 21 and the bearing sheet 19 are resistance-welded together and to the spacer block 25 and the entire assembly is fixed in the bore 15 of the bearing sleeve 13 as by welding or other suitable means so that the bearing assembly 11 cannot rotate relative to the bearing sleeve 13, but the resilient supporting element 21 can move circumferentially as the resilient support projections 27 deflect slightly under load to provide compliance and damping characteristics.

Figure 2:
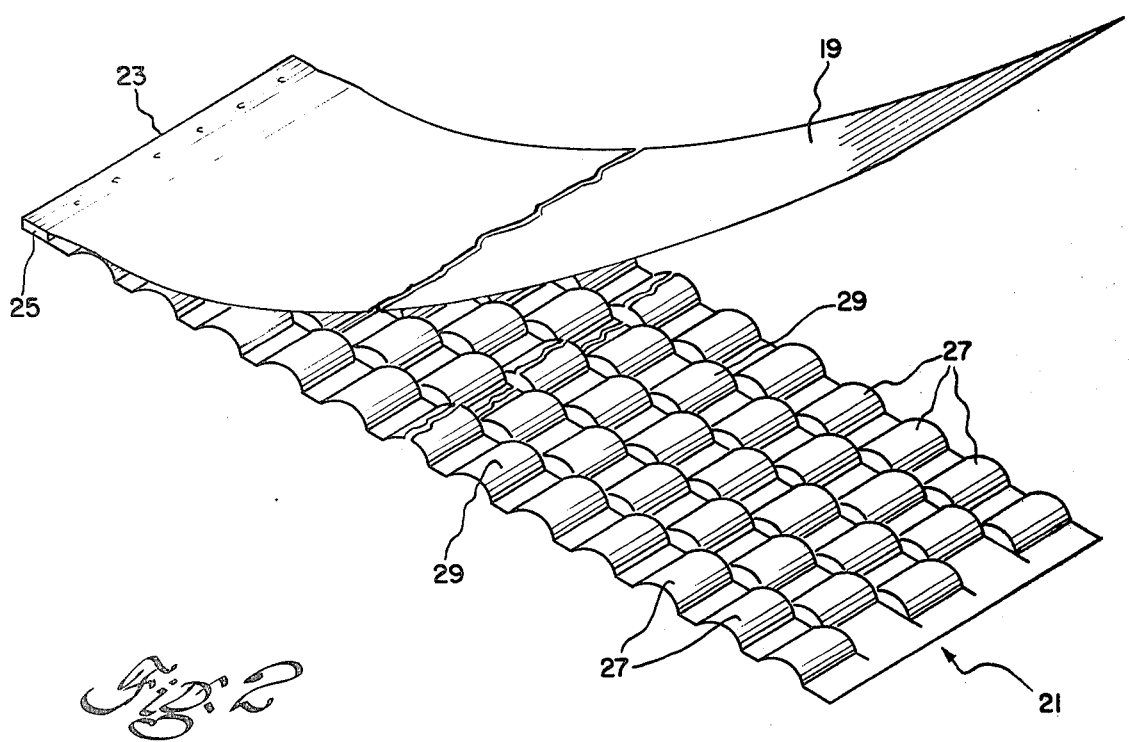
FIG. 2 is an enlarged sectional elevation of the bearing assembly unrolled from its installed configuration shown in FIG. 1.

With reference now to FIG. 2, the resilient support element 21 of the bearing assembly 11 is formed in a series of five parallel strips 29. The strips are made of steel in the anealed condition formed in the wavy corrugated pattern shown and then heat treated to produce the desired characteristics of stiffness, resilience and strength of spring steel. The wavy pattern shown is approximately a sinusodial wave form with the lower sections or valleys of the wave form made flat to increase the surface contact area between the support element and the bore 15 of the bearing sleeve 13.

Figure 3:
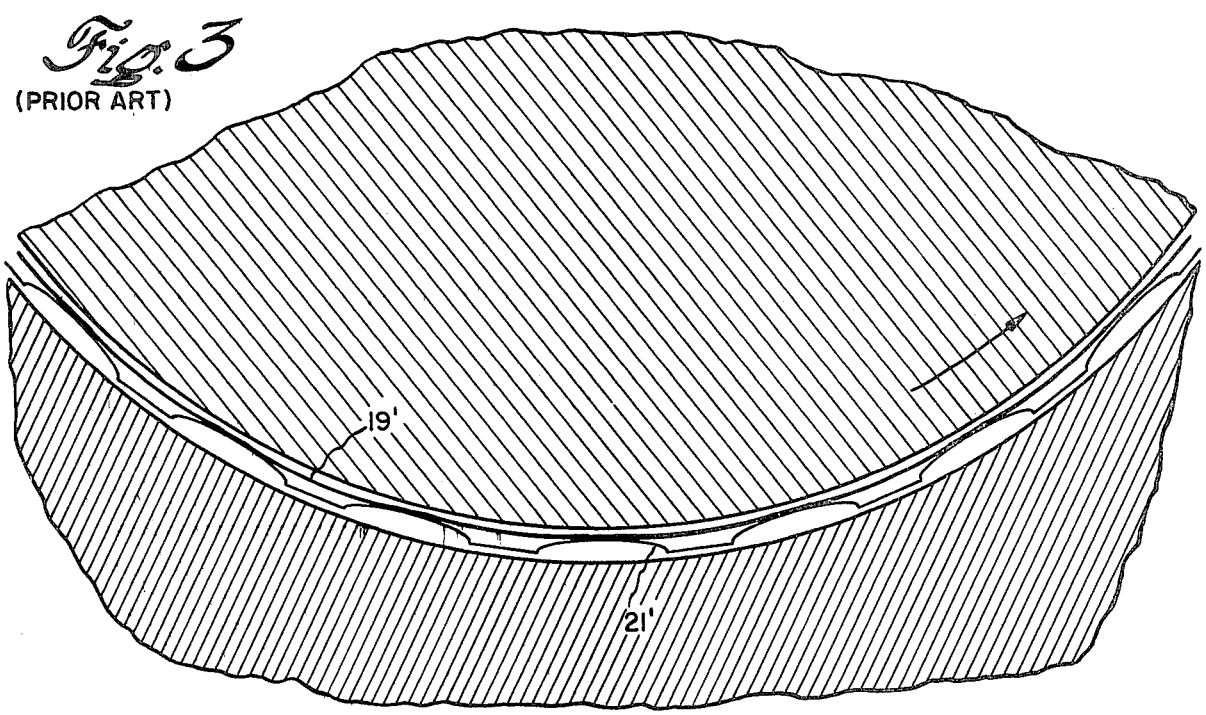
FIG. 3 is an enlarged sectional elevation of a bearing of the prior art in operation.

The wave pattern of adjacent strips 29 is offset longitudinally with respect to the adjacent strips by an amount equal to ½ of the wave length of the wave form. This arrangement produces a matrix pattern of support zones for the bearing sheet 19 which in plan view is approximately in the nature of a checkerboard pattern. Although the total support force exerted by the support element 21 is no greater and possibly even less in this embodiment than in the prior art illustrated in FIG. 3, the effect produced by the support element is quite different. As shown in FIG. 3, the prior art support element 21' permits a certain degree of deflection of the bearing sheet 19' between adjacent elevations of the resilient support element 21'. Each of these deflections produces its own hydrodynamic supporting fluid film which provides a support for the rotating shaft 17' which is adequate for most prior art applications. However, by making the support for the bearing sheet 19 more uniform, a more uniform hydrodynamic fluid film is created, thereby increasing the load-bearing capacity of this bearing.

Figure 4:
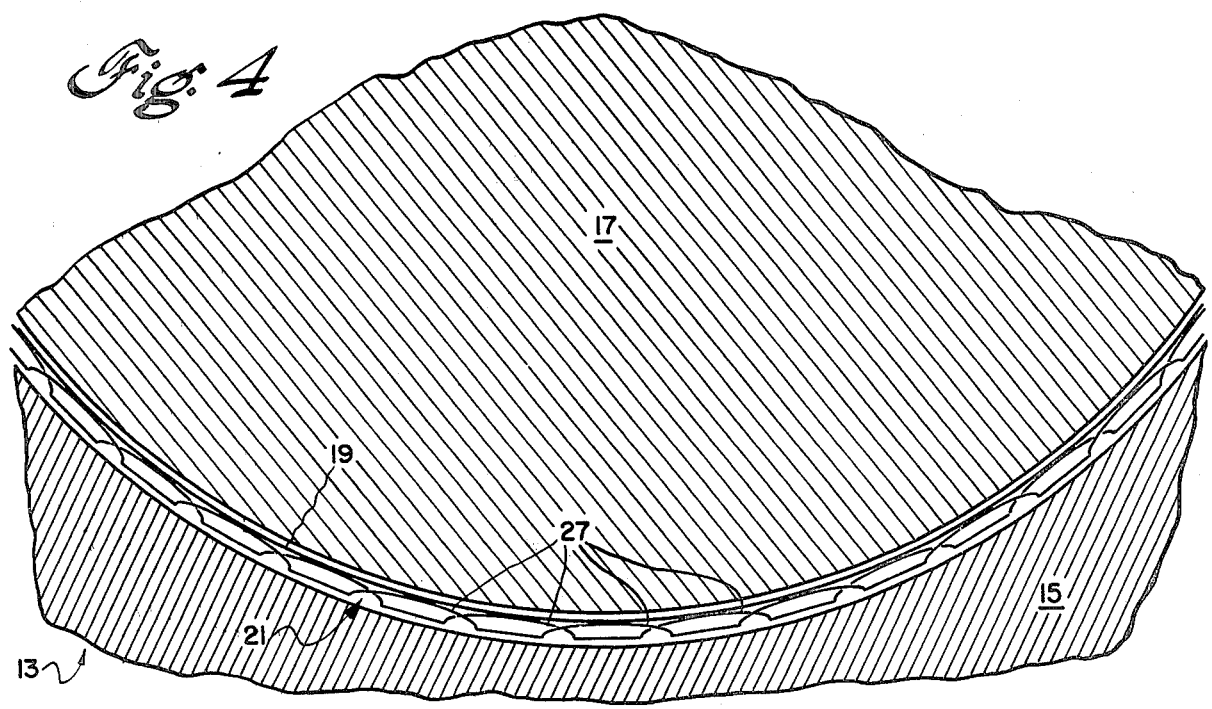
FIG. 4 is a view like FIG. 3, but of a bearing according to this invention in operation.

Greater uniformity of support is achieved in this invention by rearranging the pattern of the resilient projections of the support element 21 so that they produce a more uniform support matrix for the bearing sheet 19. As shown in FIG. 4, the span between adjacent support zones is decreased so that the total pattern of support for the bearing sheet 19 is made more uniform. This produces a smoother deflection pattern for the bearing sheet so that it deflects in a larger converging wedge encompassing the entire lower portion of the bearing rather than a series of smaller supporting fluid films distributed around the lower portion of the bearing. The effect of this new arrangement is to increase the total effective area of support and to increase the mean pressure of the supporting fluid film. The bearing sheet 19 supported uniformly deflects uniformly to enable a continuous supporting fluid film having a smooth pressure profile to be generated over a load-carrying zone which extends for approximately 120° of the shaft circumference.

Figure 5:
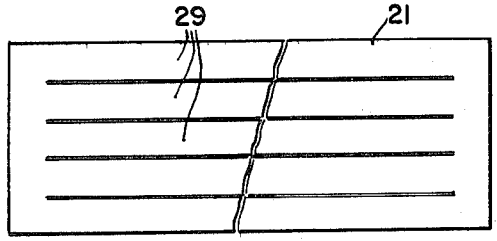
FIGS. 5 and 6 are plan views of two sheets for making the supporting element of this invention.
Figure 6:
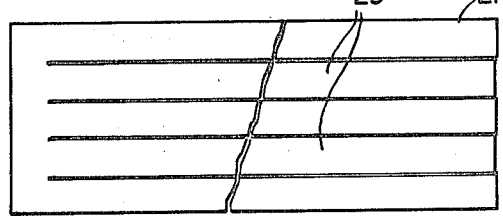

FIGS. 5 and 6 show two different sheets from which the resilient support element 21 can be formed. In FIG. 5 the sheet is slit in five parallel cuts running from adjacent one end to adjacent the other end. The sheets are then formed in a static press-operated die, or can be fed through a die which has a series of gear-like corrugated rotors offset from one another by $\frac{1}{2}$ of a pitch so that the wave form produced by the die arrangement is a series of corrugated strips attached to the two ends and having wave forms which are offset from those of adjacent strips by one-half wave length. This arrangement is advantageous because it offers the fastest and potentially cheapest fabrication and produces an element which is easily assembled into a compliant bearing. However, it requires careful design and quality control to remain within tolerances and to avoid distorting the end portions of the element to ensure that they will lie flat at the free end and will lie flat against the spacer block 25 during assembly, so that a smooth and flat end 23 is produced.

In FIG. 6 the sheet from which the support element 21 is formed is slit in five parallel slits starting from adjacent one end and running completely through the other end. This slit sheet then, like the sheet in FIG. 5, is processed in a die to produce the corrugated patterns offset in adjacent strips by $\frac{1}{2}$ wave length. The free ends of the support element 21 shown in FIG. 7 can be left free and the tendency for the individual strips to spread can be prevented by shoulders 30 shown on the outside edges of the bearing sleeve 13. These shoulders should be a height equal to approximately $\frac{1}{2}$ of the height of the bumps. The strips will not tend to cross inwardly because the alternating corrugations will hold them apart.

Other numbers of strips may be used, however, it is preferable that it be an odd number. An even number of strips would make the corrugations of the outside strips offset from each other which could cause some imbalance in the shaft for small shafts or large projections 27.

Obviously, numerous modifications and variations of the disclosed embodiment are possible in view of the teachings contained herein. It is to be expressly understood that these modifications and variations, and equivalents thereof, may be employed while remaining within the spirit and scope of my invention which is defined in the appended claims.

Wherein I claim:

1. A compliant hydrodynamic fluid bearing, comprising:
    a bearing sleeve having a cylindrical bore formed therein;
    a rotatable shaft received within said cylindrical bore and defining a gap between such shaft and said bore;
    a bearing assembly received within said gap, including a resilient supporting element and a bearing sheet;
    said bearing sheet being connected at one end thereof to one end of said supporting element, and having a bearing surface facing said shaft;
    said supporting element operatively supporting said bearing sheet in said bore, said supporting element including at least three longitudinal strips disposed side-by-side and having formed therein a pattern of resilient projections, the pattern in adjacent strips being offset so that projections on portions of one strip lie intermediate the projections on adjacent portions of the adjacent strips on either side;
    whereby said supporting element uniformly supports said bearing sheet upon a matrix of support zones distributed in a pattern across said bearing sheet to minimize local deflections of said bearing sheet, so that a large area, high pressure supporting hydrodynamic fluid film will be generated by relative rotation of said shaft and said bearing sheet.

2. The bearing defined in claim 1, wherein said supporting element includes an odd number of strips, and the projections on the outside strips are laterally aligned.

3. The bearing defined in claim 2, wherein pairs of two strips spread equidistant from the center strip have equal spacing between adjacent projections and said projections are laterally aligned on said pairs of strips.

4. The bearing defined in claim 1, wherein said pattern of resilient projections is the same on all of said strips, and said pattern in adjacent strips is offset by one-half of the spacing between adjacent projections so that the projections on one strip lie laterally adjacent the valleys of the adjacent strips.

5. The bearing defined in claim 1, wherein said support element is formed from a single sheet of metal which has four laterally spaced parallel slits dividing said sheet into five longitudinal strips connected together at said one end.

6. The bearing defined in claim 5, wherein said strips are connected together at each longitudinal end.

7. The bearing defined in claim 5 wherein said strips are free at the other longitudinal end, and wherein said sleeve is provided with shoulders at each axial end to retain said support element in said bore.

8. The bearing defined in claim 1, wherein said support element includes two outside strips and at least two next adjacent inside strips; the majority of said projections on said next adjacent strips being offset from the projections on said outside strips.

9. The bearing defined in claim 8, wherein said projections on said outside strips are equally spaced along said strips and laterally aligned with each other.

10. The bearing defined in claim 9, wherein said support element includes at least one additional strip disposed inside said next adjacent inside strips and having projections which are laterally aligned with the projections on said outside strips.

11. An improved compliant bearing of the type wherein a first bearing element, providing a bearing surface, is disposed in juxtaposition with and connected at one position to a second bearing element having surface elevations which are operative to resiliently support said first bearing element, wherein the improved comprises: an arrangement of said surface elevations of said second bearing element disposed in a checkered pattern of resilient elevations aligned in one direction and staggered in an orthogonal direction so that said second bearing element resiliently supports said first bearing element on a matrix of support zones providing a good approximation of continuous support.

* * * * *